(12) United States Patent
Zhou

(10) Patent No.: US 12,364,249 B1
(45) Date of Patent: Jul. 22, 2025

(54) PET BEHAVIOR INTERACTION DEVICE

(71) Applicant: SHENZHEN ZHEYIN INTELLIGENT TECHNOLOGY CO., LTD., Shenzhen (CN)

(72) Inventor: Yongkai Zhou, Shenzhen (CN)

(73) Assignee: SHENZHEN ZHEYIN INTELLIGENT TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/676,583

(22) Filed: May 29, 2024

(51) Int. Cl.
*A01K 15/02* (2006.01)
*A01K 29/00* (2006.01)

(52) U.S. Cl.
CPC .......... *A01K 15/021* (2013.01); *A01K 29/005* (2013.01)

(58) Field of Classification Search
CPC ..... A01K 15/02; A01K 15/021; A01K 29/005
See application file for complete search history.

(56) References Cited

U.S. PATENT DOCUMENTS

| | | | |
|---|---|---|---|
| 2007/0204802 A1* | 9/2007 | Davies | G16H 40/67 |
| | | | 119/712 |
| 2007/0266959 A1* | 11/2007 | Brooks | A01K 29/005 |
| | | | 119/720 |
| 2012/0312247 A1* | 12/2012 | Ebersole | A01K 15/02 |
| | | | 340/573.3 |
| 2014/0083364 A1* | 3/2014 | Anderson | A01K 15/02 |
| | | | 119/51.01 |
| 2016/0242387 A1* | 8/2016 | Ecker | A01K 15/021 |
| 2020/0323171 A1* | 10/2020 | Crosby | A01K 15/025 |
| 2025/0072395 A1* | 3/2025 | Hieber | A01K 15/021 |

FOREIGN PATENT DOCUMENTS

| | | | | |
|---|---|---|---|---|
| DE | 202021106477 U1 * | 2/2022 | | A01K 29/005 |
| WO | WO-2020032337 A1 * | 2/2020 | | A01K 29/005 |
| WO | WO-2024177531 A1 * | 8/2024 | | |

OTHER PUBLICATIONS

Birdhouse (Year: 2022).*
Companion animal smart care system (Year: 2020).*
Pet training device (Year: 2024).*

* cited by examiner

*Primary Examiner* — Yvonne R Abbott-Lewis
(74) *Attorney, Agent, or Firm* — JEEN IP LAW, LLC

(57) ABSTRACT

A pet behavior interaction device includes: a protective housing provided with a battery and a processing unit; two sides of the protective housing are symmetrically and fixedly provided with a fixed side frame; when an installation seat is installed in a specified position, one end of a detection slider will detach from a detection insertion slot on one side of a fixed slider, thereby completing a fixation of a fixed strap and the installation seat being fixed only when it is installed in the specific position, it is convenient for an operator to determine a fixed operation of the behavior interaction device and operates whether the installation of the behavior interaction device is carried out according to regulations. This solves a problem that the existing behavior interaction device usually does not have a good fixing detection mechanism during multiple disassembly process of the behavior interaction device.

8 Claims, 8 Drawing Sheets

PET BEHAVIOR INTERACTION DEVICE

TECHNICAL FIELD

The present disclosure relates to the field of pet behavior interaction technologies, and in particular, to a pet behavior interaction device.

BACKGROUND

Pet behavior interaction devices are devices aim at assisting a pet owner in better interaction and communication with a pet. These devices typically include a sensor and intelligent technologies that can monitor and analyze pet's behavior, interact with the pet in an appropriate way.

In a process of using the behavior interaction device, the behavior interaction device is firstly fixed to the pet. As the behavior interaction device is carried by the pet, after a period of use, the behavior interaction device needs to be charged regularly. Therefore, the behavior interaction device needs to be disassembled repeatedly. However, in a process of multiple disassembly of the behavior interaction device, the behavior interaction device usually does not have a good fixing detection mechanism. In a process of fixing the behavior interaction device, an operational error occurs, and which may cause the behavior interaction device to be fall off when the pet moves, and results in a loss of the behavior interaction device.

SUMMARY

The embodiment of the present disclosure relates to a pet behavior interaction device. When an installation seat is installed in a specific position, one end of a detection slider will detach from a detection insertion slot on one side of a fixed slider, and the fixed slider will move downwards under a force of a spring of a second connection joint to complete a fixation of a fixed strap, thus the installation seat will be fixed only when it is installed in the specific position, it is convenient for an operator to determine a fixed operation of the behavior interaction device and operates whether the installation of the behavior interaction device is carried out according to regulations, thereby effectively reducing an occurrence of falling of the behavior interaction device.

A first aspect of the present disclosure provides the purpose and efficacy of a pet behavior interaction device, including: a protective housing, the protective housing has a square shaped housing structure and is provided with a battery and a processing unit; two sides of the protective housing are symmetrically and fixedly provided with a fixed side frame; one side of the fixed side frame is provided with an installation seat that is clamp provided;
  the protective housing further includes: an installation plate having a rectangular shaped plate structure and provided at a front end of the protective housing; a camera provided at a front end of the installation plate and electrically connected to the processing unit of the protective housing; a detection unit provided at a bottom of the protective housing and electrically connected to the processing unit of the protective housing; and a charging port provided in a middle of a rear end of the protective housing.

In an embodiment of the present disclosure, the fixed side frame further includes:
  a fixed insertion slot, which has a long strip shaped slot structure and provided at one side of the fixed side frame;
  a connection block, which has a long strip shaped block structure, there are two groups of connection blocks, and the connection blocks are symmetrically and fixedly provided at upper and lower ends of the fixed side frame;
  a detection sliding plate, which has a rectangular shaped plate structure and is slidably provided at a rear end of the fixed insertion slot.

In an embodiment of the present disclosure, the fixed side frame further includes:
  a detection slider, which has a long strip shaped block structure, there are two groups of detection sliders, and the detection sliders are symmetrically and integrally provided at upper and lower ends of the detection sliding plate;
  a first connection joint, which has an arc-shaped head structure and is integrally provided on one side of the detection slider; a spring is provided between the first connection joint and the connection block;
  an installation block, which has a rectangular shaped block structure, there are two groups of installation blocks, and the installation blocks are symmetrically and fixedly provided at a front end of the fixed side frame.

In an embodiment of the present disclosure, the fixed side frame further includes:
  an installation side block, which has a rectangular shaped block structure and is integrally provided at a front end of the installation block; a connection sliding groove is provided between one side of the installation block and a top of the installation side block;
  a fixed slider, which has a rectangular shaped block structure and is slidably provided on one side of the installation block;
  a toggle block, which has a square shaped block structure and is integrally provided at a top of a front end of the fixed slider.

In an embodiment of the present disclosure, the fixed side frame further includes:
  a detection insertion slot, which has a square shaped slot structure, is provided at a rear end of the fixed slider, and matches with one end of the detection slider;
  a second connection joint, which has an arc-shaped head structure, is integrally provided on one side of the fixed slider, and is slidably connected to the connection sliding groove of the installation block; a spring is provided between the second connection joint and the connection sliding groove of the installation block;
  a limit sliding frame, which has a rectangular shaped frame structure and is slidably provided at a top of the installation side block.

In an embodiment of the present disclosure, the fixed side frame further includes:
  a third connection joint, which has an arc-shaped head structure, is integrally provided at a bottom of the limit sliding frame, and is slidably connected to the connection sliding groove of the installation side block; a spring is provided between the third connection joint and the connection sliding groove of the installation side block;
  a limit insertion slot, which has a square shaped slot structure, is provided on one side of the limit sliding frame, and matches with the toggle block;
  a connection side block, which has a square shaped block structure, is integrally provided on the other side of the limit sliding frame, and an outside of the connection side block is provided with an anti-slip pattern.

In an embodiment of the present disclosure, the installation seat further includes: a fixed insertion block, which has a T-shaped block structure, is integrally provided in a middle of one side of the installation seat, and is slidably connected to the fixed insertion slot.

In an embodiment of the present disclosure, the installation seat further includes:
a fixed side block, which has a rectangular shaped block structure and is integrally provided on one side of the installation seat;
a fixed strap, which is made of an elastic material and is fixedly provided at a bottom of the fixed side block.

The present disclosure provides a pet behavior interaction device, which has the following beneficial effects:

by a fit between the sliding plate and the fixed slider, the behavior interaction device has a fixed detection function. When fixing the behavior interaction device, and the installation seat is installed in a specified position, one end of the detection slider will detach from the detection insertion slot on one side of the fixed slider, and the fixed slider will move downwards under a force of a spring of a second connection joint to complete a fixation of a fixed strap. Then, the installation seat will be fixed only when it is installed in the specified position, which is convenient for an operator to determine a fixed operation of the behavior interaction device and operates whether the installation of the behavior interaction device is carried out according to regulations, thereby effectively reducing a phenomenon of falling of the behavior interaction device.

By providing with the limit sliding frame, a fixation stability of the behavior interaction device can be effectively improved. By a contact between the limit insertion slot on one side of the limit sliding frame and the toggle block, movements of the fixed slider in up and down can be limited, which causes it to be unable to slide. After the fixed strap is fixed by the fixed slider and limited by the fixed slider so as to further reduce the movement of the fixed slider during a process of pet moving or playing, which causes a detachment between the installation seat and the protective housing, thereby strengthening the fixing stability of the installation seat by the fixed slider.

By providing with a detection unit and a camera to the behavioral interaction device, specific motion information of the pet can be obtained. Besides, the size of pet clothing or chest straps can be used to determine which category the pet belongs to of the pet's size. Based on this information, different standards of electric shock, vibration, and buzzing schemes can be used on an APP system through the detection unit. In additionally, the information obtained from the sensor can better inform a pet owner of pet's information, such as health, sleep, dietary state, and exercise level. Thus, a better pet care plan can be developed.

BRIEF DESCRIPTION OF DRAWINGS

In order to provide a clearer explanation of the technical solution of the embodiments of the present disclosure, the accompanying drawings of the embodiments will be briefly introduced below.

The accompanying drawings in the following description only relate to some embodiments of the present disclosure, rather than limiting the present disclosure.

Figure 1:
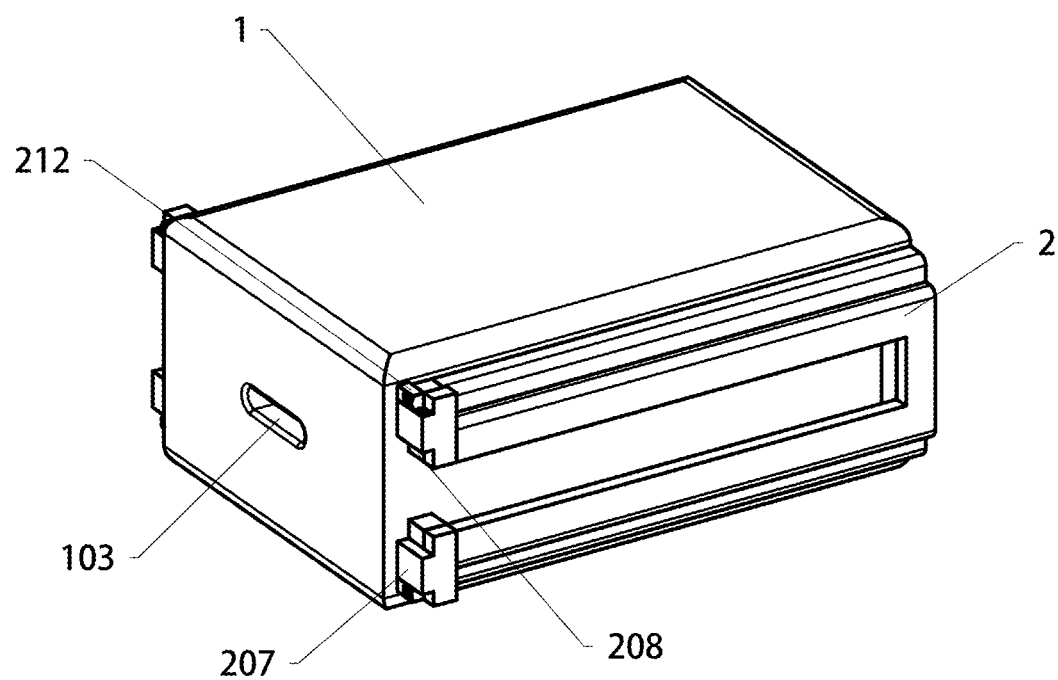
FIG. 1 is a side perspective schematic structural diagram of an axial of a protective housing of a pet behavior interaction device in an embodiment of the present disclosure.
Figure 2:
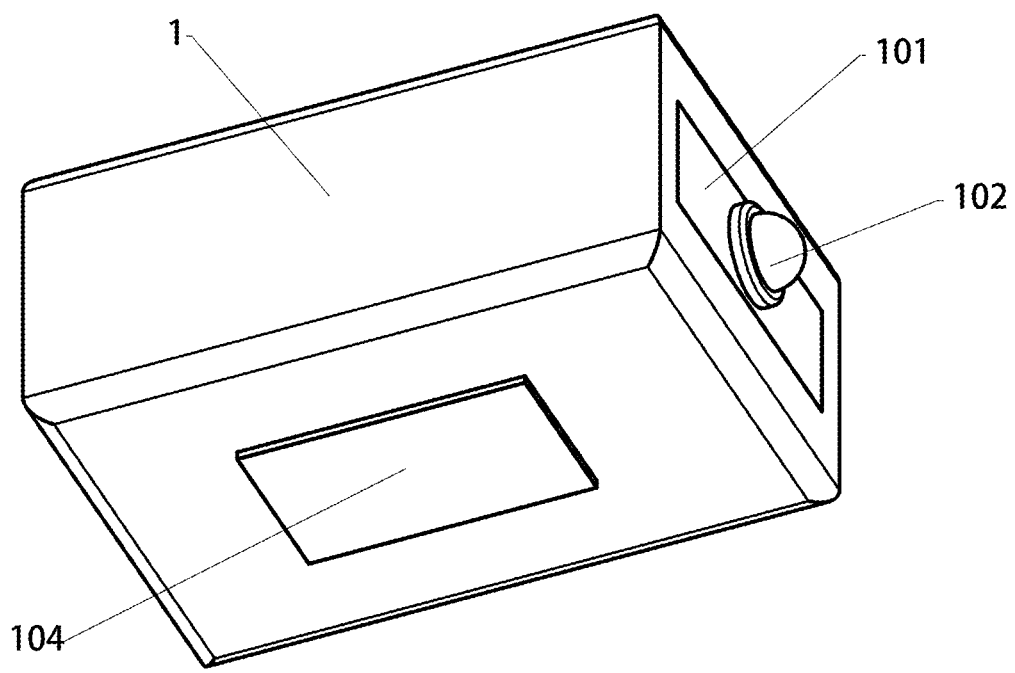
FIG. 2 is a top schematic structural diagram of the protective housing of the pet behavior interaction device in an embodiment of the present disclosure.

Numeral reference: 1—protective housing; 101—installation plate; 102—camera; 103—detection unit; 104—charging port; 2—fixed side frame; 201—fixed insertion slot; 202—connection block; 203—detection sliding plate; 204—detection slider; 205—first connection joint; 206—installation block; 207—installation side block; 208—fixed slider; 209—toggle block; 210—detection insertion slot; 211—second connection joint; 212—limit sliding frame; 213—third connection joint; 214—limit insertion slot; 215—connection side block; 3—installation seat; 301—fixed insertion block; 302—fixed side block; 303—fixed strap.

DESCRIPTION OF EMBODIMENTS

In order to clarify the purpose, scheme, and advantages of the technical solution of the present disclosure, the following will provide a clear and complete description of the technical solution of the embodiments of the present disclosure in combination with the accompanying drawings.

As shown in FIGS. 1 to 8

Embodiment 1: the present disclosure proposes a pet behavior interaction device, which includes a protective housing 1 having a square shaped housing structure; the protective housing 1 is provided with a battery and a processing unit, two sides of the protective housing 1 are symmetrically and fixedly provided with a fixed side frame 2; one side of the fixed side frame 2 is provided with an installation seat 3 that is clamp provided; the protective housing 1 further includes: an installation plate 101 having a rectangular shaped plate structure and provided at a front end of the protective housing 1; a camera 102 provided at a front end of installation plate 101 and electrically connected to the processing unit of protective housing 1; a detection unit 103 provided at a bottom of the protective housing 1 and electrically connected to the processing unit of the protective housing 1; and a charging port 104 provided at a middle of a rear end of the protective housing 1.

Where, the fixed side frame 2 further includes: a fixed insertion slot 201 that has a long strip shaped slot structure, provided on one side of the fixed side frame 2; and a connection block 202 that has a long strip shaped block structure. There are two groups of connection blocks 202, and the connection blocks 202 are symmetrically and fixedly provided at upper and lower ends of the fixed side frame 2.

Where, the installation seat 3 further includes: a fixed insertion block 301, having a T-shaped block structure, integrally provided in a middle of one side of the installation base 3 and slidably connected to the fixed insertion slot 201; a fixed side block 302 having a rectangular shaped block structure and integrally provided on one side of the installation seat 3; and a fixed strap 303 made of an elastic material and fixedly provided at a bottom of the fixed side block 302.

The specific usage and function of this embodiment:

During a using process of the behavior interaction device, the behavior interaction device is fixed to a pet through the fixed strap 303. The detection unit 103 and camera 102 are connected to the behavior interaction device to obtain specific motion information of the pet. Then, the size of the pet's clothing or chest and back straps can be used to determine which category the pet belongs to.

Based on this information, different standards of electric shock, vibration, and buzzing schemes can be used on an APP system through the detection unit 103. The information obtained from a sensor can better inform a pet owner of pet's information, such as health, sleep, dietary state, exercise level, etc. Thus, a better pet care plan can be developed.

Figure 3:
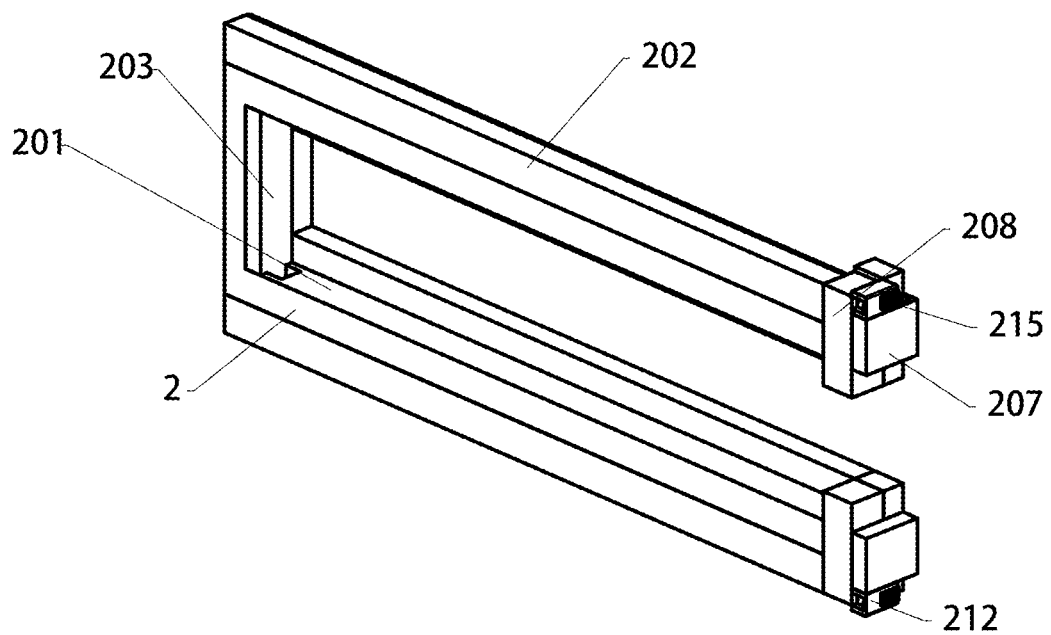
FIG. 3 is a schematic structural diagram of a fixed side frame of the pet behavior interaction device in an embodiment of the present disclosure.
Figure 4:
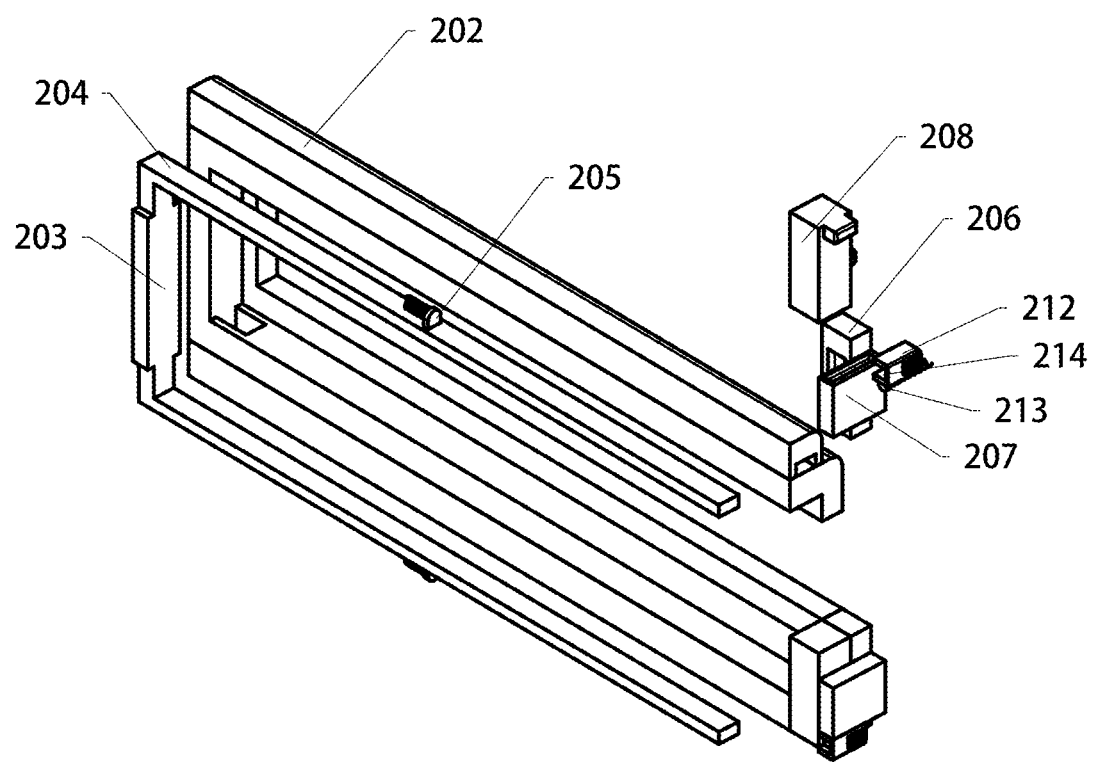
FIG. 4 is a schematic structural diagram of a disassembly of the fixed side frame of the pet behavior interaction device in an embodiment of the present disclosure.

Embodiment 2, based on Embodiment 1, as shown in FIGS. 3 and 4; a pet behavior interaction device, which includes a fixed side frame 2, and further includes a detection sliding plate 203 having a rectangular shaped plate structure and slidably provided at a rear end of the fixed insertion slot 201; a detection slider 204 having a long strip shaped block structure, there being two groups of detection sliders 204 and the detection sliders 204 being symmetrically and integrally provided at upper and lower ends of the detection sliding plate 203; a first connection joint 205 having an arc-shaped head structure and integrally provided on one side of the detection slider 204, and a spring being provided between the first connection joint 205 and the connection block 202; an installation block 206 having a rectangular shaped block structure, there being two groups of installation blocks 206 and the installation blocks 206 being symmetrically and fixedly provided at a front end of the fixed side frame 2; a detection insertion slot 210 having a square shaped slot structure, provided at a rear end of the fixed slider 208, and matched with one end of the detection slider 204; a second connection joint 211 having an arc-shaped head structure, integrally provided on one side of the fixed slider 208, and slidably connected to the connection sliding groove of the installation block 206. A spring is provided between the second connection joint 211 and the connection sliding groove of the installation block 206.

Where, the fixed side frame 2 further includes: an installation side block 207 having a rectangular shaped block structure, integrally provided at a front end of the installation block 206, and a connection sliding groove being provided between one side of the installation block 206 and a top of the installation side block 207; a fixed slider 208 having a rectangular shaped block structure, slidably provided on one side of the installation block 206; and a toggle block 209 having a square shaped block structure and integrally provided at a top of a front end of the fixed slider 208.

The working principle of this embodiment: when fixing the behavior interaction device, the fixed insertion block 301 on one side of the installation seat 3 is inserted into the fixed insertion slot 201 and when the fixed insertion block 301 is fully inserted into the fixed insertion slot 201, the fixed insertion block 301 will trigger the detection sliding plate 203 to move, and the detection sliding plate 203 will drive the detection slider 204 to move. When one end of the detection slider 204 detached from the detection insertion slot 210 on one side of the fixed slider 208, which indicates that the installation seat 3 is installed in a specified position, the fixed slider 208 will move downwards under a force of the spring of the second connection joint 211. The bottom of the second connection joint 211 will limit the sliding of the fixed insertion block 301, thereby completing the fixation of the fixed strap 303.

Figure 5:
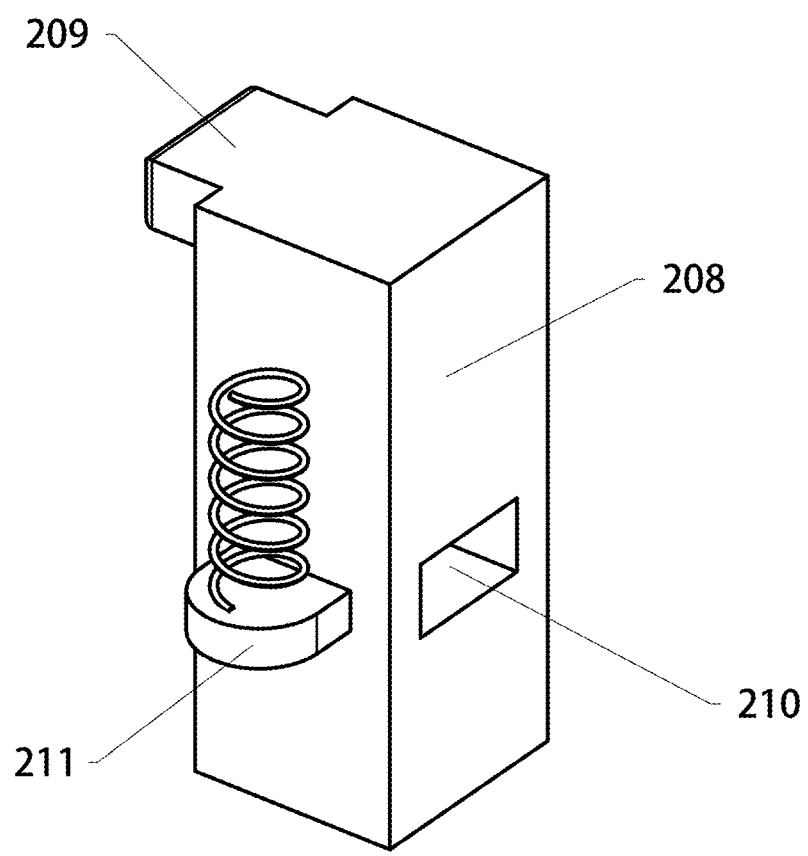
FIG. 5 is a schematic structural diagram of a fixed slider of the pet behavior interaction device in an embodiment of the present disclosure.
Figure 6:
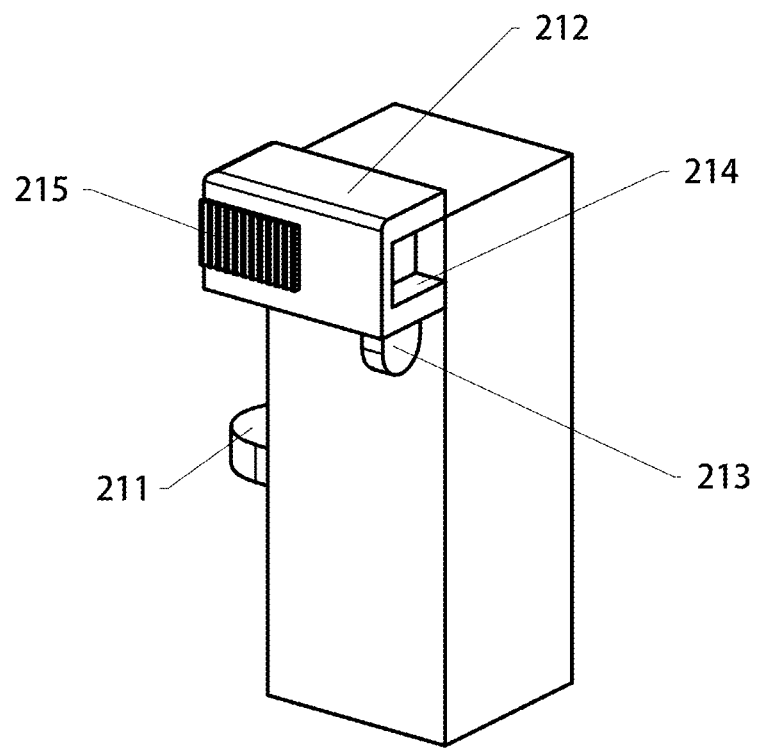
FIG. 6 is a schematic structural diagram of the pet behavior interaction device when the fixed slider is limited by a limit sliding frame in an embodiment of the present disclosure.
Figure 7:
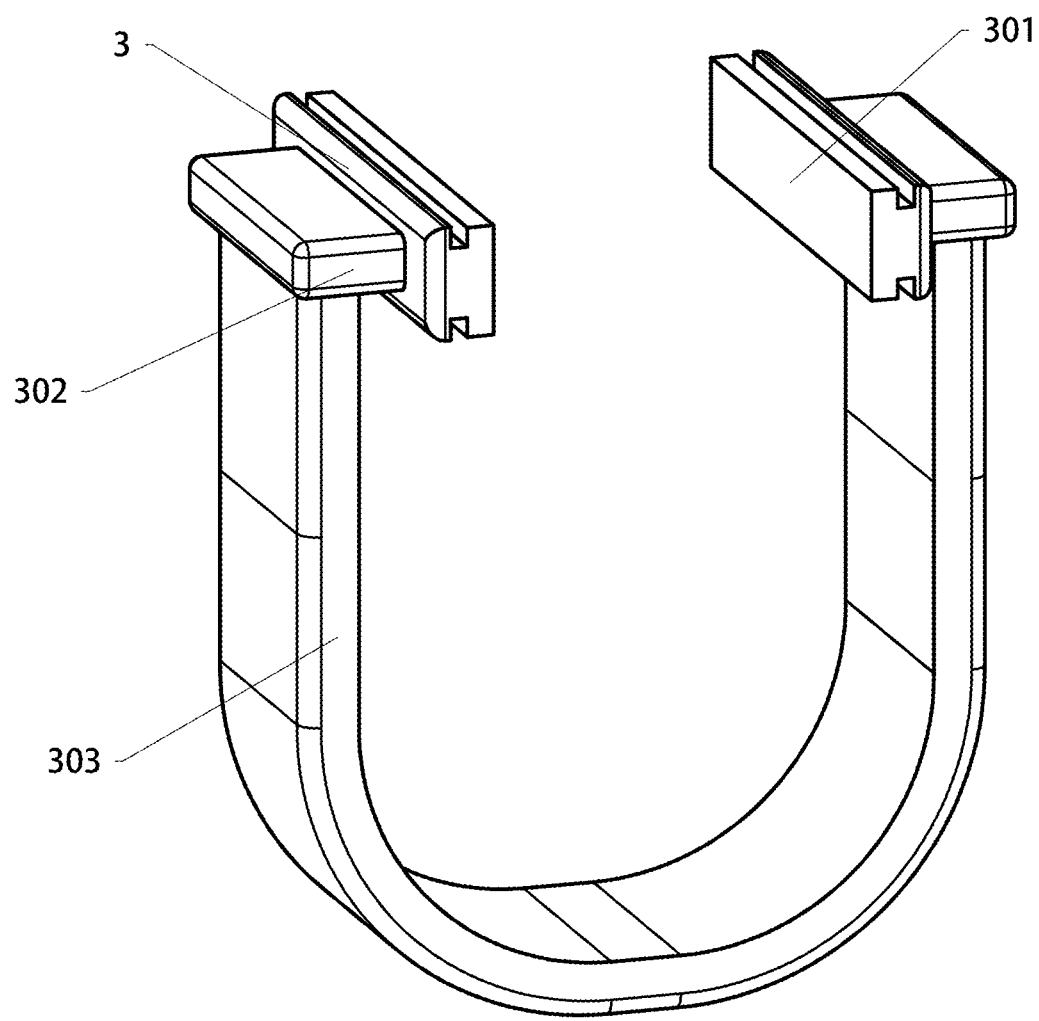
FIG. 7 is a schematic structural diagram of an installation seat of the pet behavior interaction device in an embodiment of the present disclosure.
Figure 8:
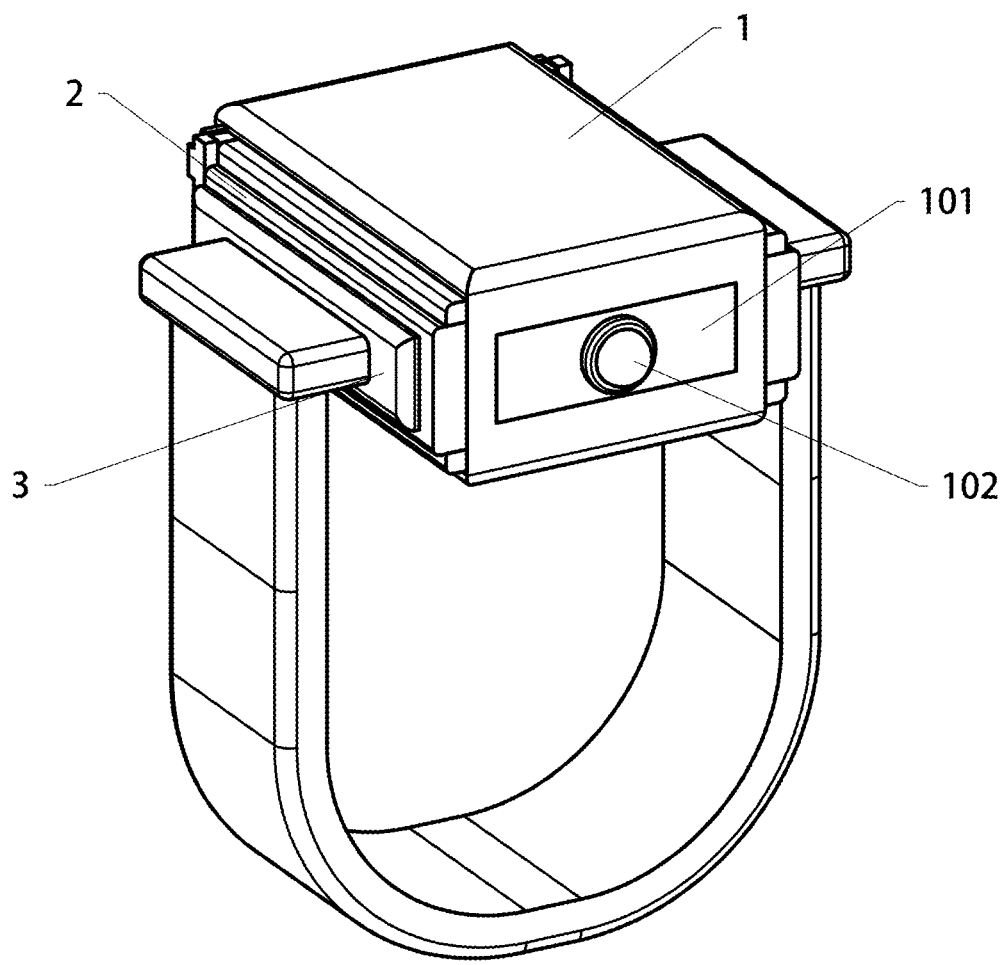
FIG. 8 is a perspective schematic structural diagram of an overall axial side of the pet behavior interaction device in an embodiment of the present disclosure.

Embodiment 3, based on Embodiment 2, as shown in FIGS. 5 and 6; a pet behavior interaction device, which includes: a fixed side frame 2, and further includes a limit sliding frame 212 having a rectangular shaped frame structure and provided at a top of the installation side block 207; a third connection joint 213 having an arc-shaped head structure, integrally provided at a bottom of the limit sliding frame 212, slidably connected to the connection sliding groove of the installation side block 207, and a spring being provided between the third connection joint 213 and the connection sliding groove of the installation side block 207; a limit insertion slot 214 having a square shaped slot structure, provided on one side of the limit sliding frame 212; and matched with the toggle block 209; and a connection side block 215 having a square shaped block structure, integrally provided on the other side of the limit sliding frame 21. An anti-slip pattern is provided on an outside of the connection side block 215.

The working principle of this embodiment: when the fixing of the fixed strap 303 is completed, the limit sliding frame 212 will move to one side under a drive of the spring. The limit insertion slot 214 on one side of the limit sliding frame 212 contacts the toggle block 209, movements of the fixed slider 208 in up and down are limited, which causes the fixed slider 208 to be unable to slide, thereby limiting the fixed slider 208.

The above are only exemplary embodiments of the present disclosure, and are not intended to limit the protection scope of the present disclosure. The protection scope of the present disclosure is determined by the claims.

What is claimed is:

1. A pet behavior interaction device, comprising: a protective housing, wherein the protective housing has a square shaped housing structure and is provided with a battery and a processing unit; two sides of the protective housing are symmetrically and fixedly provided with a fixed side frame; one side of the fixed side frame is provided with an installation seat that is clamp provided;

the protective housing further comprises: an installation plate having a rectangular shaped plate structure and provided at a front end of the protective housing; a camera provided at a front end of the installation plate and electrically connected to the processing unit of the protective housing; a detection unit provided at a bottom of the protective housing and electrically connected to the processing unit of the protective housing; and a charging port provided in a middle of a rear end of the protective housing.

2. The pet behavior interaction device as claimed in claim 1, wherein the fixed side frame further comprises:
 a fixed insertion slot, which has a long strip shaped slot structure and provided at one side of the fixed side frame;
 a connection block, which has a long strip shaped block structure, there are two groups of connection blocks, and the connection blocks are symmetrically and fixedly provided at upper and lower ends of the fixed side frame;

a detection sliding plate, which has a rectangular shaped plate structure and is slidably provided at a rear end of the fixed insertion slot.

3. The pet behavior interaction device as claimed in claim 2, wherein the fixed side frame further comprises:
- a detection slider, which has a long strip shaped block structure, there are two groups of detection sliders, and the detection sliders are symmetrically and integrally provided at upper and lower ends of the detection sliding plate;
- a first connection joint, which has an arc-shaped head structure and is integrally provided on one side of the detection slider; a spring is provided between the first connection joint and the connection block;
- an installation block, which has a rectangular shaped block structure, there are two groups of installation blocks, and the installation blocks are symmetrically and fixedly provided at a front end of the fixed side frame.

4. The pet behavior interaction device as claimed in claim 3, wherein the fixed side frame further comprises:
- an installation side block, which has a rectangular shaped block structure and is integrally provided at a front end of the installation block; a connection sliding groove is provided between one side of the installation block and a top of the installation side block;
- a fixed slider, which has a rectangular shaped block structure and is slidably provided on one side of the installation block;
- a toggle block, which has a square shaped block structure and is integrally provided at a top of a front end of the fixed slider.

5. The pet behavior interaction device as claimed in claim 4, wherein the fixed side frame further comprises:
- a detection insertion slot, which has a square shaped slot structure, is provided at a rear end of the fixed slider, and matches with one end of the detection slider;
- a second connection joint, which has an arc-shaped head structure, is integrally provided on one side of the fixed slider, and is slidably connected to the connection sliding groove of the installation block; a spring is provided between the second connection joint and the connection sliding groove of the installation block;
- a limit sliding frame, which has a rectangular shaped frame structure and is slidably provided at a top of the installation side block.

6. The pet behavior interaction device as claimed in claim 5, wherein the fixed side frame further comprises:
- a third connection joint, which has an arc-shaped head structure, is integrally provided at a bottom of the limit sliding frame, and is slidably connected to the connection sliding groove of the installation side block; a spring is provided between the third connection joint and the connection sliding groove of the installation side block;
- a limit insertion slot, which has a square shaped slot structure, is provided on one side of the limit sliding frame, and matches with the toggle block;
- a connection side block, which has a square shaped block structure, is integrally provided on the other side of the limit sliding frame, and an outside of the connection side block is provided with an anti-slip pattern.

7. The pet behavior interaction device as claimed in claim 1, wherein the installation seat further comprises: a fixed insertion block, which has a T-shaped block structure, is integrally provided in a middle of one side of the installation seat, and is slidably connected to the fixed insertion slot.

8. The pet behavior interaction device as claimed in claim 7, wherein the installation seat further comprises:
- a fixed side block, which has a rectangular shaped block structure and is integrally provided on one side of the installation seat;
- a fixed strap, which is made of an elastic material and is fixedly provided at a bottom of the fixed side block.

* * * * *